UNITED STATES PATENT OFFICE.

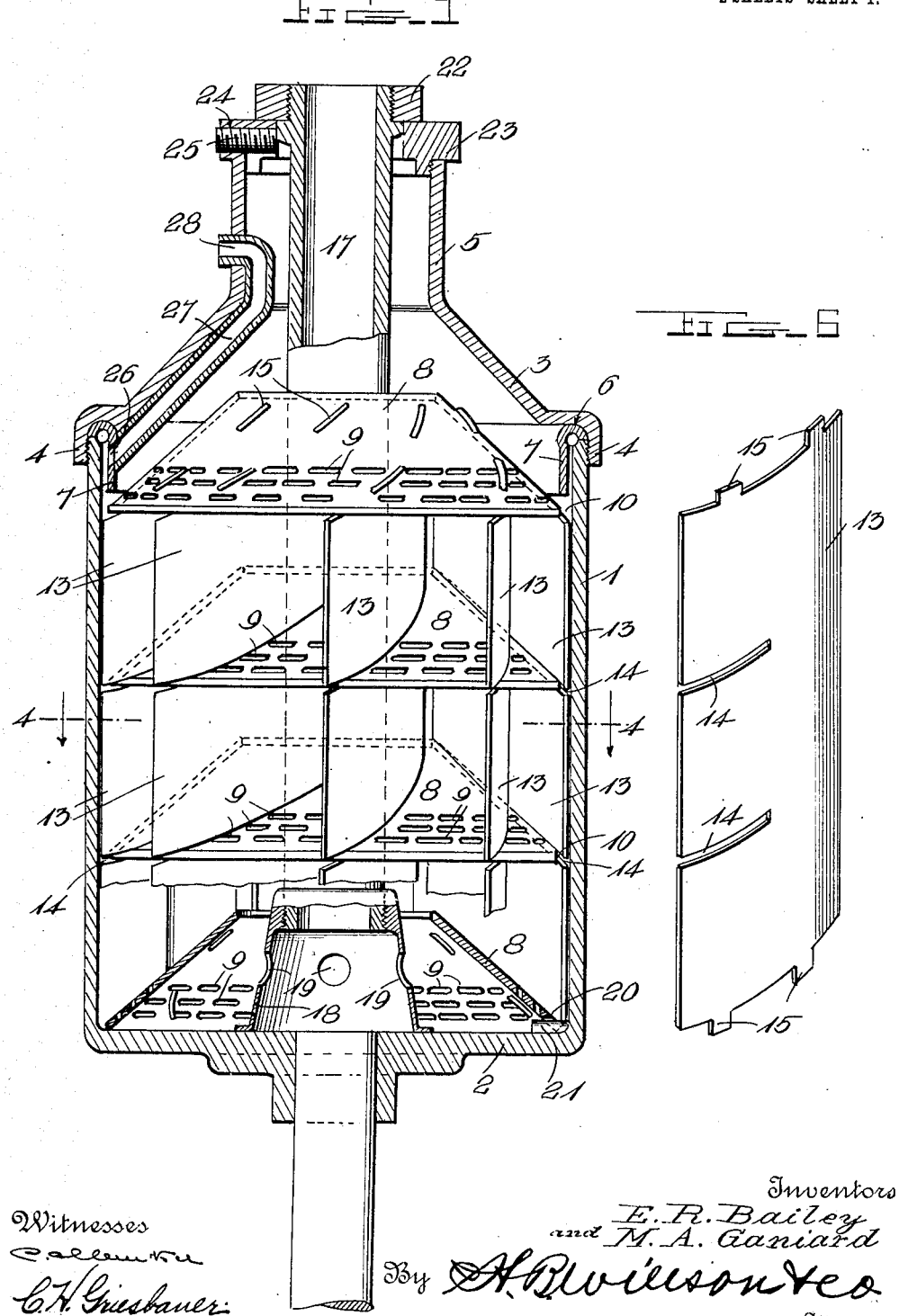

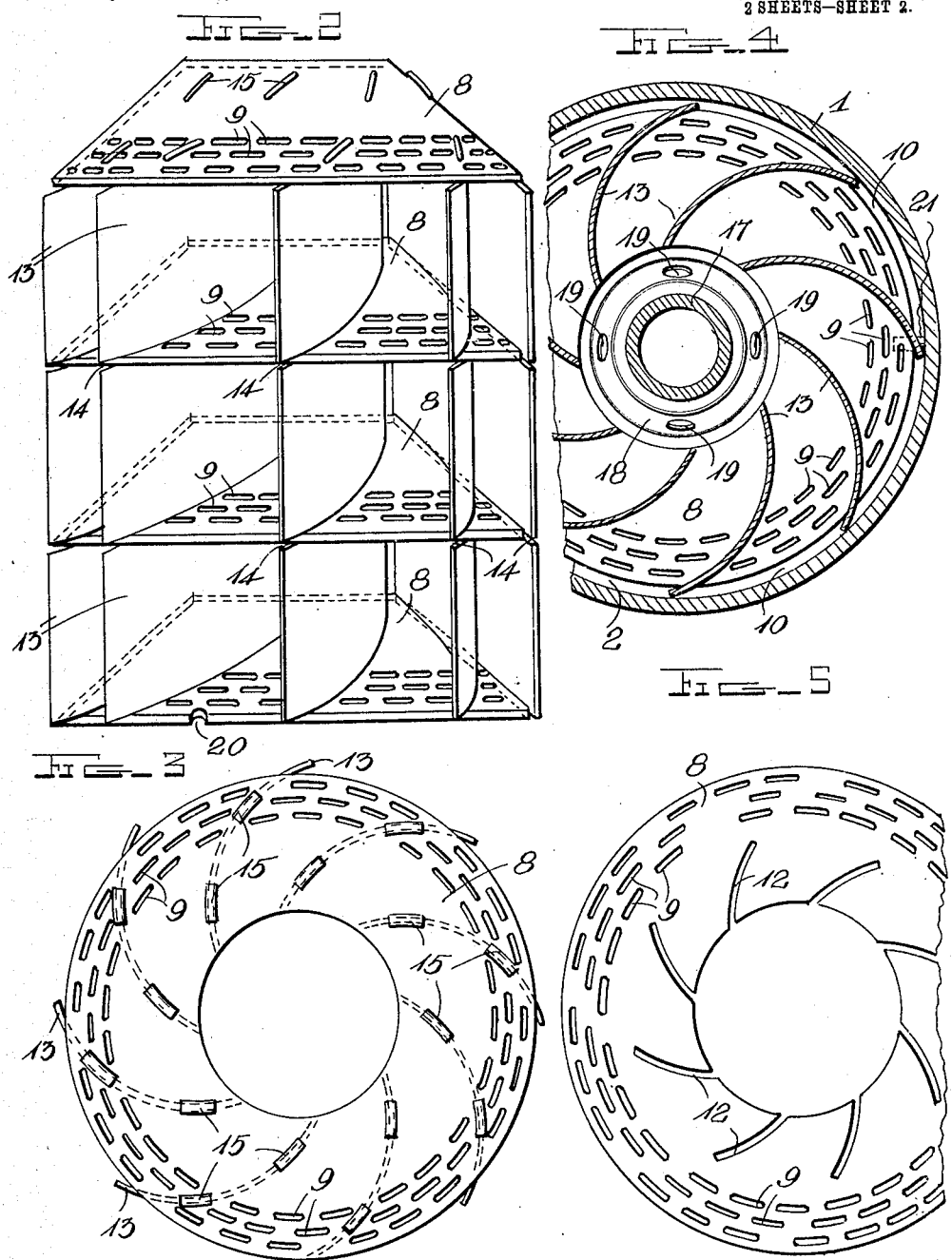

EDGERLY R. BAILEY AND MYRON A. GANIARD, OF CLARINDA, IOWA.

CREAM-SEPARATOR.

No. 916,254.  Specification of Letters Patent.  Patented March 23, 1909.

Application filed June 29, 1908. Serial No. 440,961.

*To all whom it may concern:*

Be it known that we, EDGERLY R. BAILEY and MYRON A. GANIARD, citizens of the United States, residing at Clarinda, in the county of Page and State of Iowa, have invented certain new and useful Improvements in Cream-Separators; and we do declare the following to be a full, clear, and exact description of the invention, such as will enable others skilled in the art to which it appertains to make and use the same.

This invention relates to new and useful improvements in cream separators.

The principal object of the invention is to provide an improved device of this kind whereby the separation of the cream from the milk may be expeditiously accomplished, and wherein the component parts of the bowl liner may be readily disassembled for cleaning, and when again assembled will render the bowl liner as rigid and durable as if constructed in one piece.

With these and other objects in view, the invention, consists of certain novel features of construction, combination and arrangement of parts, as will be more fully described and particularly pointed out in the appended claim.

As is well known to those versed in this art, it is desirable to retard the flow of the milk from the center to the periphery of the bowl, in order to permit the fatty globules of cream to rise at the center and escape in the usual manner. This is accomplished by the embodiment specifically exemplified in the accompanying drawings, in which, Figure 1 is a central longitudinal section of the device complete; Fig. 2 is a side elevation of the bowl liner; Fig. 3 is a plan view thereof; Fig. 4 is a horizontal section taken on line 4—4 of Fig. 1; Fig. 5 is a plan view of one of the intermediate disks; and Fig. 6 is a detail perspective view on an enlarged scale of one of the curved wings.

In the embodiment illustrated the bowl 1, which is of cylindrical form is provided with a bottom 2, and at its upper end with a cap 3, having a rim 4, to receive the upper end of the bowl, and a central cylindrical contracted portion 5, at its upper end, the lower end of the cap seating on an annular shoulder 6, produced at the upper edge of a rim 7, arranged within and at the upper end of the bowl, the shoulder bearing upon the upper end of the bowl.

In carrying out the invention, a series of vertically spaced hollow truncated cones 8, provided near their lower edges with three or more circular series of elongated slots or openings, 9 are arranged within the bowl, the greatest diameter of the cones being slightly less than the interior diameter of the bowl in order to provide a space 10, between the lower edges of the cones and the perimeter of the bowl, the purpose of which will be shown, and each of the intermediate of said cones is also provided with a series of equally spaced arc-shaped slots 12, which extend from the upper edges of the cones to approximately half the distance of the lower edges thereof. A plurality of upright curved wings 13 are arranged in the bowl, said wings being formed in their outer side edges with transverse slots 14, for the reception of the lower portion of the intermediate cones, the solid portions of the wings being received by the slots 12 of the cones. When the wings are arranged in position, the inner side edges thereof are flush with the upper edges of the cones and the outer edges of said wings project beyond the lower edges of the cones and engage the perimeter of the bowl. The ends of these wings are inclined to fit the outer and inner surfaces of the lower and upper end cones, respectively, and each of said wings is provided at each end with a pair of spaced lugs 15 which extend through corresponding openings in the end cones and are flattened against the surfaces thereof after having been inserted in position in order to hold the wings in secure connected relation with the end cones.

A feed or supply tube 17, extends centrally and vertically through the cones, the lower end of said tube screwing into an upright casing 18, arising centrally and upwardly from the bottom of the bowl, the casing having a number of outlet ports or openings 19 to permit the passage of the milk to the bowl. The lower end cone is provided in its lower edge with a recess 20, adapted to receive a rib 21 produced on the perimeter of the bowl, by which construction the bowl liner may be held against rotation relatively to the bowl, and a means is provided whereby the bowl liner may always be placed in a certain position relative to the bowl which is necessary to the proper operation of the device. The upper end of the feed tube is provided with an annular shoulder 22, which seats on a cap 23, screwing into the upper cylindrical contracted portion 5, of the cap 3, the cap 23, having an outlet port 24 which is adapted to be closed by a plug 25 screwing into said cap.

In the operation of the invention, the milk is set in motion by the wings 13 and flows to the perimeter of the bowl by the centrifugal force generated, as will be understood. It is evident that the heavier part of the milk will be the first to flow to the perimeter of the bowl and in doing so is sufficiently retarded by the curved wings and cones to permit the lighter part of the milk, or what is known as the cream, to flow through the cones to the outlet opening 24, from which it may be conducted to any suitable receptacle.

The wings not only set the milk in motion, but coöperate with the perforated portions of the cones in providing skimming surfaces and in retarding the flow of the skimmed milk to the perimeter of the bowl. It is to be particularly observed that after the skimmed milk has reached the perimeter of the bowl, it is allowed to flow upward through the annular space 10 between the lower ends of the cones and the perimeter of the bowl without further interference and eventually passes through an opening 26, in the rim 7, and thence through an outlet tube 27, extending upwardly into the cup 5, and having an outturned portion 28, which extends therethrough and which may be connected with any suitable receptacle for receiving the skimmed milk.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus described our invention, what we claim as new is:—

In a cream separator, the combination with a cylindrical bowl, of a series of vertically spaced hollow truncated cones of less diameter than the interior diameter of the bowl, arranged therein, the intermediate cones being formed in their upper edges with series of equally spaced arcuate slots, and at the end cones with upper and lower series of lug receiving slots, and a series of vertically arranged transversely curved wings formed in their outer edges with arcuate slots to receive the lower unslotted portions of the intermediate cones, whereby the wings may be arranged in position with their inner side edges flush with the inner edges of the cones, said wings being also formed at opposite ends with spaced lugs to extend through the lug receiving slots of the end cones, the wings being held in permanent position by flattening the ends of the lugs thereof against the slotted portions of the end cones.

In testimony whereof we have hereunto set our hands in presence of two subscribing witnesses.

EDGERLY R. BAILEY.
MYRON A. GANIARD.

Witnesses:
MINNIE POTTS,
J. E. AMNAN.